US007231652B2

(12) United States Patent
Gutta et al.

(10) Patent No.: US 7,231,652 B2
(45) Date of Patent: Jun. 12, 2007

(54) ADAPTIVE SAMPLING TECHNIQUE FOR SELECTING NEGATIVE EXAMPLES FOR ARTIFICIAL INTELLIGENCE APPLICATIONS

(75) Inventors: Srinivas Gutta, Buchanan, NY (US); Kwok Pun Lee, Flushing, NY (US); J. David Schaffer, Wappingers Falls, NY (US)

(73) Assignee: Koninklijke Philips N.V., Eindhoven (NL)

( * ) Notice: Subject to any disclaimer, the term of this patent is extended or adjusted under 35 U.S.C. 154(b) by 1118 days.

(21) Appl. No.: 09/819,286

(22) Filed: Mar. 28, 2001

(65) Prior Publication Data

US 2002/0162107 A1    Oct. 31, 2002

(51) Int. Cl.
| | |
|---|---|
| H04H 9/00 | (2006.01) |
| H04N 7/16 | (2006.01) |
| H04N 5/445 | (2006.01) |
| G06F 13/00 | (2006.01) |
| G06F 17/30 | (2006.01) |
| G06F 15/18 | (2006.01) |
| G06Q 30/00 | (2006.01) |
| G06Q 7/00 | (2006.01) |

(52) U.S. Cl. .............................. 725/46; 725/9; 725/10; 725/13; 725/53; 706/15; 705/10; 705/14
(58) Field of Classification Search .................. 725/46, 725/9–24, 47, 53; 706/15–42
See application file for complete search history.

(56) References Cited

U.S. PATENT DOCUMENTS

| | | | | | |
|---|---|---|---|---|---|
| 5,444,499 | A | * | 8/1995 | Saitoh ........................ | 348/734 |
| 5,749,081 | A | * | 5/1998 | Whiteis ...................... | 707/102 |
| 5,758,257 | A | * | 5/1998 | Herz et al. .................. | 725/116 |
| 5,801,747 | A | * | 9/1998 | Bedard ........................ | 725/46 |
| 5,867,226 | A | * | 2/1999 | Wehmeyer et al. ........... | 725/46 |
| 6,000,018 | A | | 12/1999 | Packer et al. ................ | 711/154 |
| 6,020,883 | A | * | 2/2000 | Herz et al. ................... | 715/721 |
| 6,119,112 | A | * | 9/2000 | Bush ........................... | 706/25 |
| 6,134,532 | A | | 10/2000 | Lazarus et al. ............... | 705/14 |
| 6,177,931 | B1 | * | 1/2001 | Alexander et al. ............ | 725/52 |
| 6,370,513 | B1 | * | 4/2002 | Kolawa et al. ............... | 705/10 |
| 6,418,424 | B1 | * | 7/2002 | Hoffberg et al. ............. | 706/21 |
| 6,721,953 | B1 | * | 4/2004 | Bates et al. .................. | 725/39 |
| 6,727,914 | B1 | * | 4/2004 | Gutta .......................... | 715/719 |

(Continued)

FOREIGN PATENT DOCUMENTS

WO    WO 01/15449 A1 *    3/2001    .................... 7/173

OTHER PUBLICATIONS

By Srinivas Gutta et al. Entitled, TV Content Recommender System, Philips Research Intelligent Systems Demonstrations, American Association for Artificial Intelligence. p. 1121, www.aai.org.

(Continued)

Primary Examiner—Chris Kelley
Assistant Examiner—Son P. Huynh

(57) ABSTRACT

Artificial intelligence applications require use of training sets containing positive and negative examples. Negative examples are chosen using distributions of positive examples with respect to a dominant feature in feature space. Negative examples should share or approximately share, with the positive examples, values of a dominant feature in feature space. This type of training set is illustrated with respect to content recommenders, especially recommenders for television shows.

34 Claims, 8 Drawing Sheets

U.S. PATENT DOCUMENTS

| | | | |
|---|---|---|---|
| 6,862,253 B2 * | 3/2005 | Blosser et al. | 367/93 |
| 6,898,762 B2 * | 5/2005 | Ellis et al. | 715/716 |
| 6,934,964 B1 * | 8/2005 | Schaffer et al. | 725/46 |
| 7,051,352 B1 * | 5/2006 | Schaffer | 725/39 |
| 2002/0046402 A1 * | 4/2002 | Akinyanmi et al. | 725/34 |
| 2002/0075320 A1 * | 6/2002 | Kurapati | 345/811 |
| 2002/0104087 A1 * | 8/2002 | Schaffer et al. | 725/46 |

OTHER PUBLICATIONS

U.S. Appl. No. 09/666,399, filed Dec. 17, 1999.
U.S. Appl. No. 09/666,401, filed Sep. 20, 2000.
U.S. Appl. No. 09/699,608, filed Oct. 30, 2000.
U.S. Appl. No. 09/466,406, filed Dec. 17, 1999.
U.S. Appl. No. 09/498,271, filed Feb. 4, 2000.

* cited by examiner

|  | SYSTEM PREDICTION | |
|---|---|---|
| ACTUAL | YES | NO |
| YES | TRUE POSITIVE (TP) | FALSE NEGATIVE (FN) |
| NO | FALSE POSITIVE (FP) | TRUE NEGATIVE (TN) |

FIG. 15

| THRESHOLD RATE | NUMBER OF HITS | NUMBER OF FALSE NEGATIVES | NUMBER OF TRUE REJECTIONS | NUMBER OF FALSE POSITIVES | HIT RATE | FALSE POSITIVE RATE |
|---|---|---|---|---|---|---|
| 0.00 | 41 | 0 | 0 | 8 | 100.0000 | 100.0000 |
| 0.05 | 35 | 6 | 4 | 4 | 85.3706 | 50.0000 |
| 0.10 | 34 | 7 | 4 | 4 | 82.9306 | 50.0000 |
| 0.15 | 34 | 7 | 5 | 3 | 82.9306 | 37.5000 |
| 0.20 | 33 | 8 | 5 | 3 | 80.4938 | 37.5000 |
| 0.25 | 32 | 9 | 5 | 3 | 78.0524 | 37.5000 |
| 0.30 | 32 | 9 | 5 | 3 | 78.0524 | 37.5000 |
| 0.35 | 32 | 9 | 5 | 3 | 78.0524 | 37.5000 |
| 0.40 | 31 | 10 | 6 | 2 | 75.6125 | 25.0000 |
| 0.45 | 31 | 10 | 6 | 2 | 75.6125 | 25.0000 |
| 0.50 | 31 | 10 | 7 | 1 | 75.6125 | 14.2900 |
| 0.55 | 31 | 10 | 7 | 1 | 75.6125 | 14.2900 |
| 0.60 | 30 | 11 | 7 | 1 | 73.1720 | 14.2900 |
| 0.65 | 30 | 11 | 8 | 0 | 73.1720 | 0.0000 |
| 0.70 | 28 | 13 | 8 | 0 | 68.2900 | 0.0000 |
| 0.75 | 28 | 13 | 8 | 0 | 68.2900 | 0.0000 |
| 0.80 | 26 | 15 | 8 | 0 | 63.4134 | 0.0000 |
| 0.85 | 26 | 15 | 8 | 0 | 63.4134 | 0.0000 |
| 0.90 | 26 | 15 | 8 | 0 | 63.4134 | 0.0000 |
| 0.95 | 20 | 21 | 8 | 0 | 48.7866 | 0.0000 |
| 1.00 | 20 | 21 | 8 | 0 | 48.7866 | 0.0000 |

FIG. 16

ADAPTIVE SAMPLING TECHNIQUE FOR SELECTING NEGATIVE EXAMPLES FOR ARTIFICIAL INTELLIGENCE APPLICATIONS

I. BACKGROUND OF THE INVENTION

A. Field of the Invention

The invention relates to artificial intelligence applications that require training sets having positive and negative examples, especially recommender systems and particularly for use with television. The invention relates even more particularly to such applications that use statistically valid techniques for choosing negative examples for training sets.

B. Related Art

U.S. patent application Ser. No. 09/498,271 filed Feb. 4, 2000 (US 000018), incorporated herein by reference, discloses a television recommender system. In that system, recommendations are deduced based on a pattern of shows watched or not watched. Of course, the number of shows not watched necessarily dwarfs the number of shows watched. Accordingly, a heuristic was developed for selecting shows not watched. The heuristic was to select a not watched show for each watched show, the not watched show being taken at random from time slots other than the slot in which the corresponding watched show occurred.

In general, many artificial intelligence applications have training sets with positive and negative examples. The heuristic for selecting negative examples needs improvement over the concept of selecting negative examples at random one-by-one with reference to respective individual positive examples.

II. SUMMARY OF THE INVENTION

It is an object of the invention to improve heuristics for choosing negative examples for a training set for an artificial intelligence application.

This object is achieved in that a group of negative examples is selected corresponding to a group of positive examples, rather than one-by-one.

This object is further achieved in that the group of positive examples is analyzed according to a feature presumed to be dominant. Then a first fraction of the negative examples is taken from the non-positive possible examples sharing the feature with the positive examples.

This object is still further achieved in that a second fraction of the shows is taken from slots within a predetermined range in feature space with respect to the feature.

This object is yet still further achieved in that no negative example is taken more than once.

Advantageously the application in question is a recommender for content, such as television, where the positive examples are selected content, the negative examples are non-selected content. Advantageously, also, the feature is time of day of broadcast.

Further objects and advantages will be apparent in the following.

III. BRIEF DESCRIPTION OF THE DRAWING

The invention will now be described by way of non-limiting example with reference to the following drawings.

FIG. 1 graphs how negative examples are chosen using uniform random sampling, with respect to a particular viewer, known as user H.

FIG. 15 shows a table.

FIG. 16 shows a table

IV. DETAILED DESCRIPTION OF THE PREFERRED EMBODIMENTS

Herein the invention is described with respect to recommenders for television, but it might be equally applicable to training sets for any artificial intelligence application, including recommenders for other types of content. The term "show" is intended to include any other type of content that might be recommended by a recommender, including audio, software, and text information. The term "watch" or "watched" is intended to include any type of positive example selection, including experiencing of any type of content, e.g. listening or reading. The invention is described also with the assumption that time is the dominant feature distinguishing watched from not-watched content; however other dominant features might be used as parameters for selecting negative examples for a training set.

Figure 13:
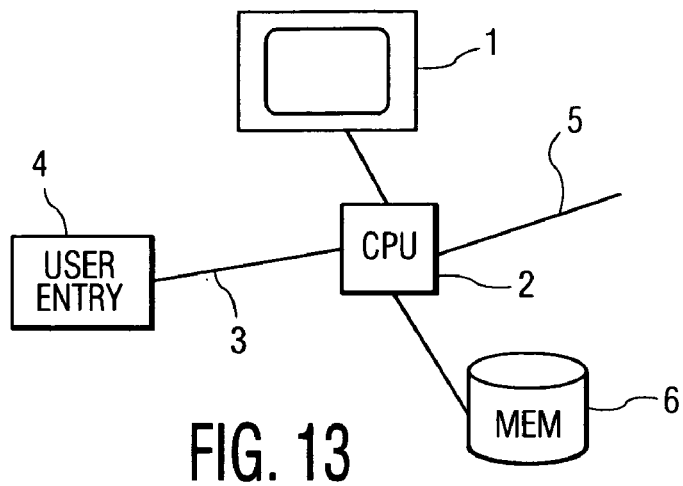
FIG. 13 shows hardware for implementing the invention.

FIG. 13 illustrates hardware for implementing the invention. The hardware will typically have a display 1; some type of processor 2; at least one user entry device 4 connected to the processor via some type of connection 3; and some type of link 5 for receiving data, such as television programming or Electronic Programming Guide ("EPG") data. The display 1 will commonly be a television screen, but could be any other type of display device. The processor 2 may be a set top box, a PC, or any other type of data processing device, so long as it has sufficient processing power. The user entry device 4 may be a remote and the connection 3 may be a wireless connection such as an infrared connection. If the processor is a PC, the user entry device will commonly be at least plural, e.g. a keyboard and a pointer device such as a mouse. The user entry device may also be a touch sensitive display. The connection 5 to the outside world could be an antenna, cable, a phone line to the internet, a network connection, or any other data link. Moreover, the link 5 may allow communication with many different types of devices such as remote processors, peripherals, and/or memory devices.

Commonly there will be at least one memory device 6, such as a CD ROM drive, floppy disk drive, hard drive, or any other type of memory device. The memory device 6 can store data, software, or both.

There may be other peripherals not shown, such as a voice recognition system, a PC camera, speakers, and/or a printer.

Figure 1:
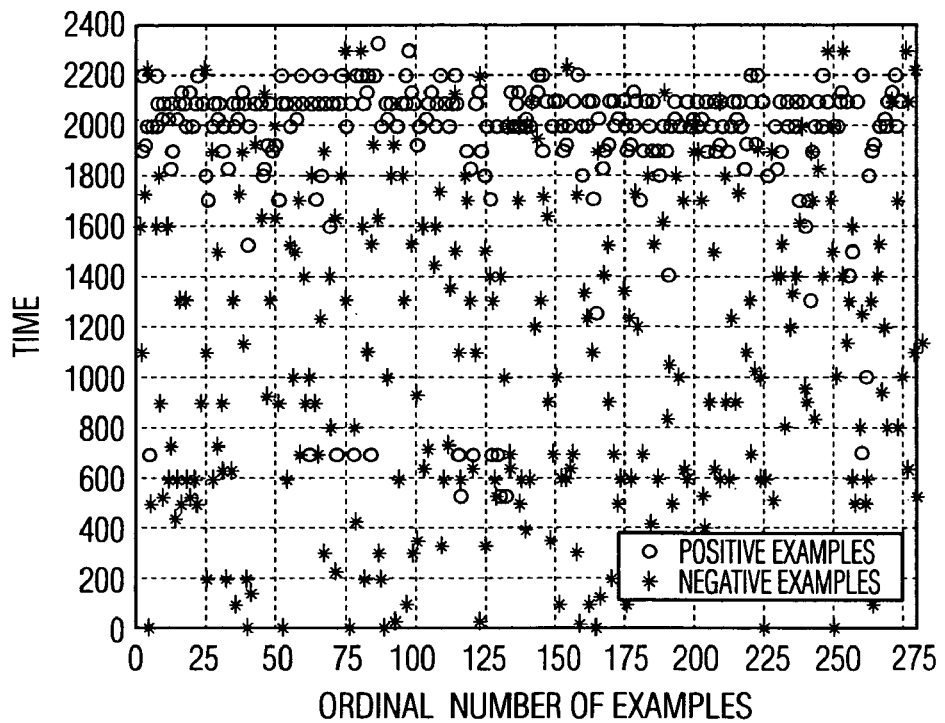

FIG. 1 shows how negative examples are chosen using uniform random sampling, with respect to a particular viewer known as User H. The vertical axis shows time of day of the show. The horizontal axis shows the ordinal number of the samples. The circles are watched shows and the crosses are the corresponding unwatched samples. It can be seen that the watched shows are primarily clustered in the prime time part of the evening, with a smattering of shows watched at other times of day, especially the very early morning, presumably before the viewer left for work or school.

Figure 2:
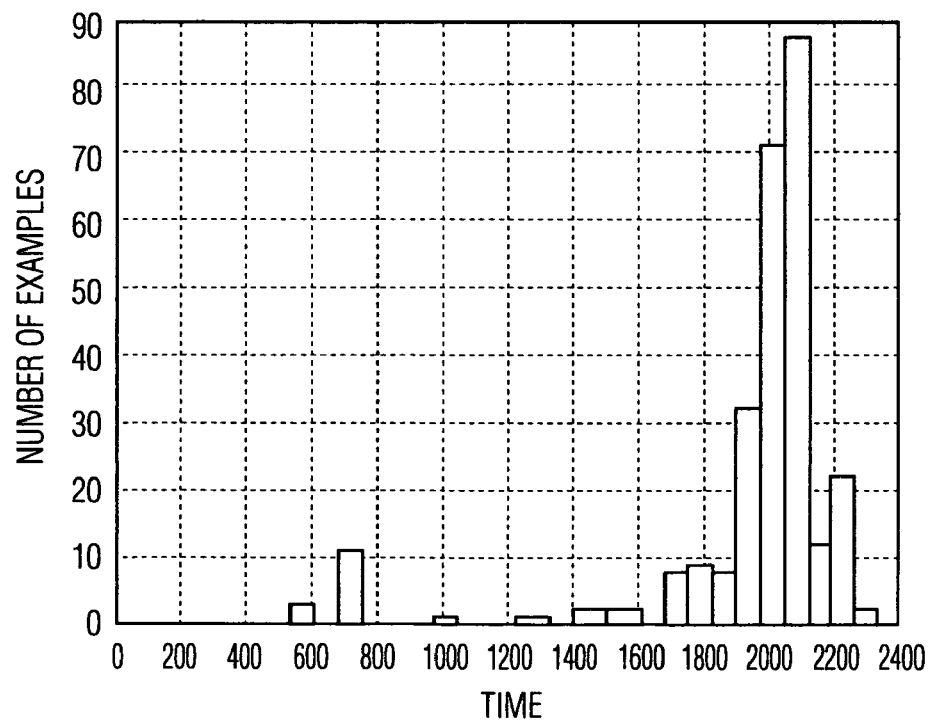
FIG. 2 shows a histogram of positive examples corresponding to FIG. 1.

FIG. 2 shows a histogram of positive examples, i.e. the cardinal number shows watched by User H, plotted against time of day, corresponding to the circle data illustrated in FIG. 1. With respect to FIGS. 2, 3, 5, 6, 9, and 10, it should be noted that the horizontal scale is only approximate. The bars should not be considered as corresponding exactly to the times listed below them.

Figure 3:
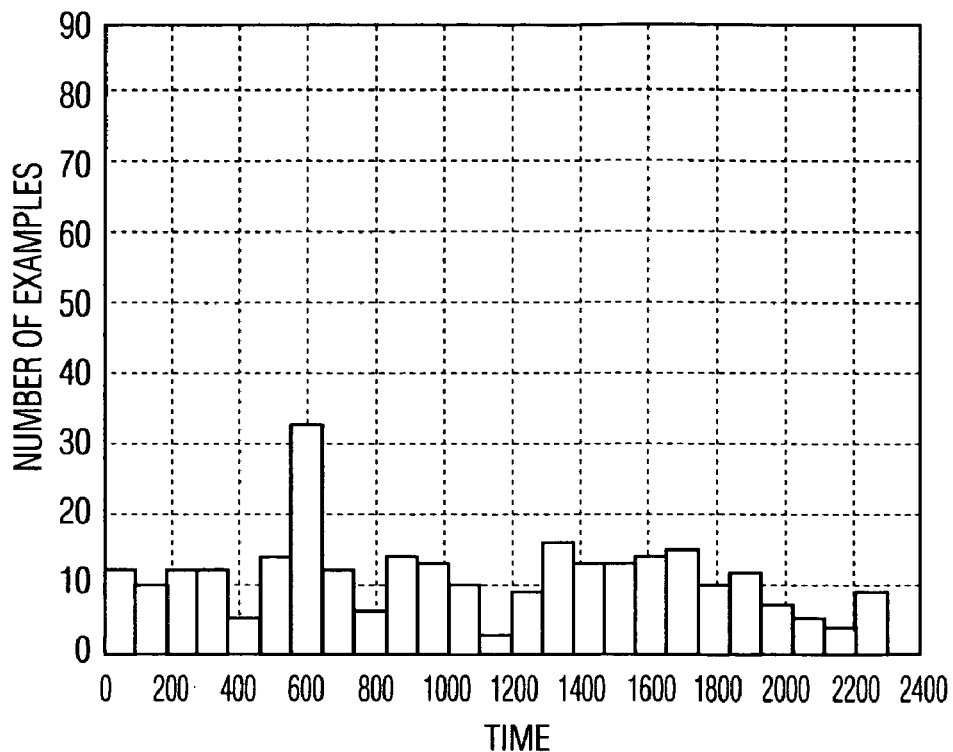
FIG. 3 shows a histogram of negative examples corresponding to FIG. 1.

FIG. 3 shows a histogram of negative examples, i.e. not watched shows, using uniform random sampling. Again a cardinal number of shows is plotted against time of day. This data corresponds to the crosses of FIG. 1.

Figure 4:
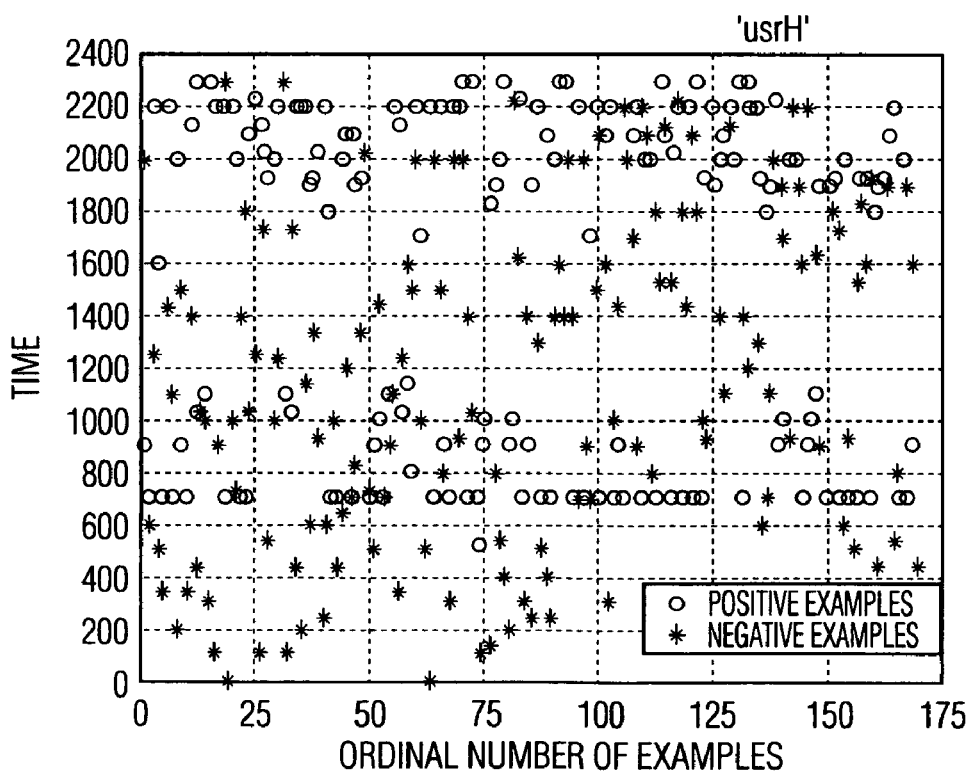
FIG. 4 is analogous to FIG. 1, except with respect to user C.

FIG. 4 is the same type of data as in FIG. 1, except that it is taken with respect to a second user, called User C. There are fewer samples taken for this user than for user H. User C has 175 samples, while User H had more than 275.

Figure 5:
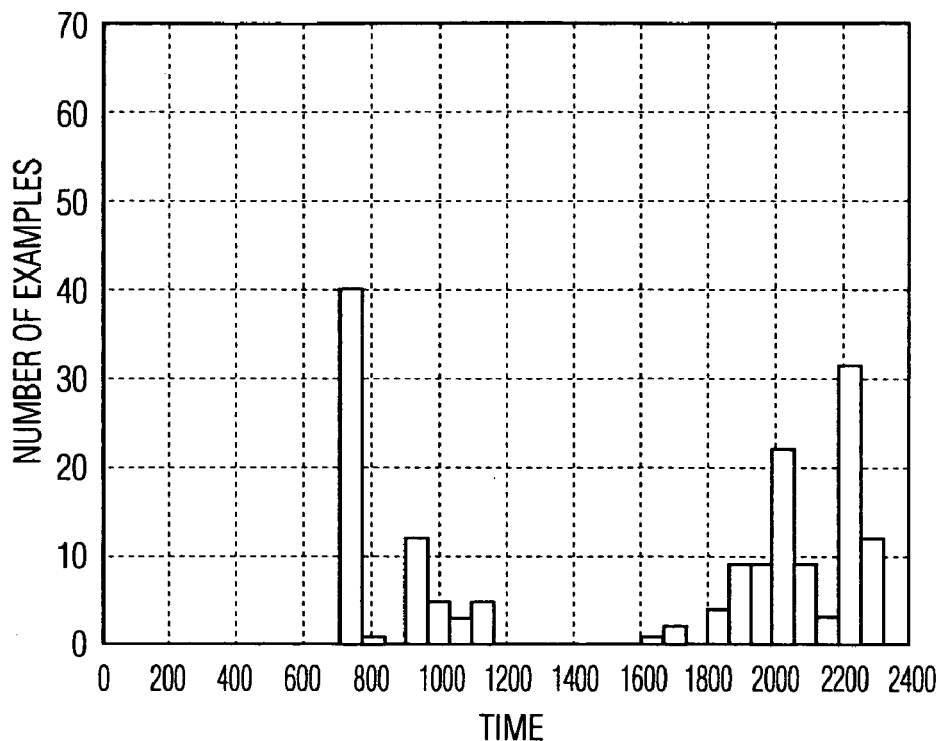
FIG. 5 is analogous to FIG. 2, except with respect to user C.

FIG. 5 is like FIG. 2, except with respect to User C.

Figure 6:
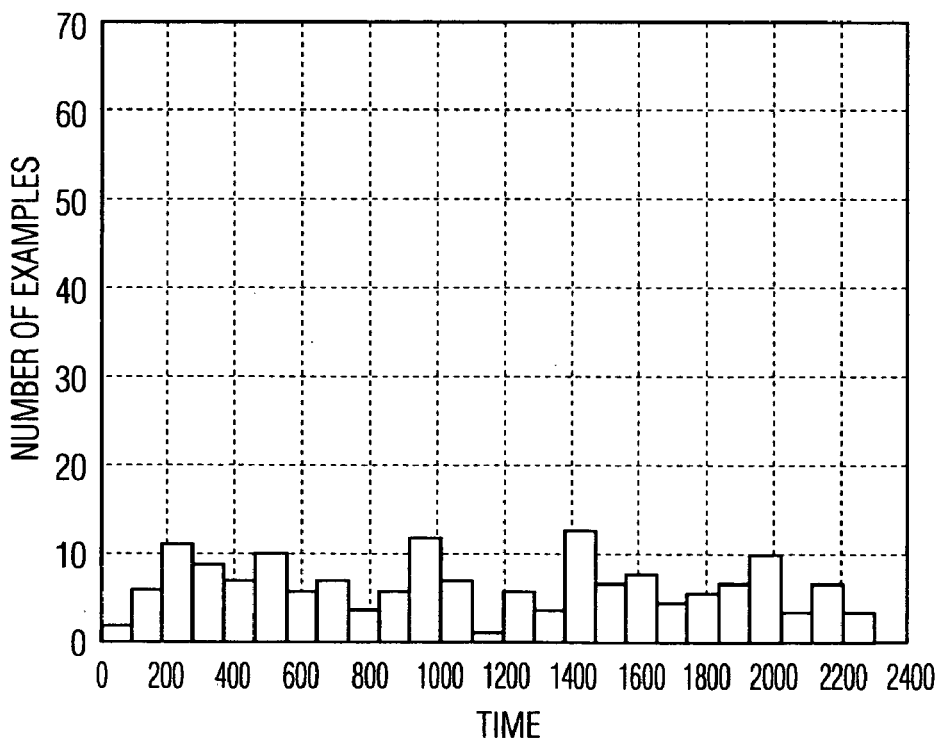
FIG. 6 is analogous to FIG. 3, except with respect to user C.

FIG. 6 is like FIG. 3, except with respect to User C.

Figure 14:
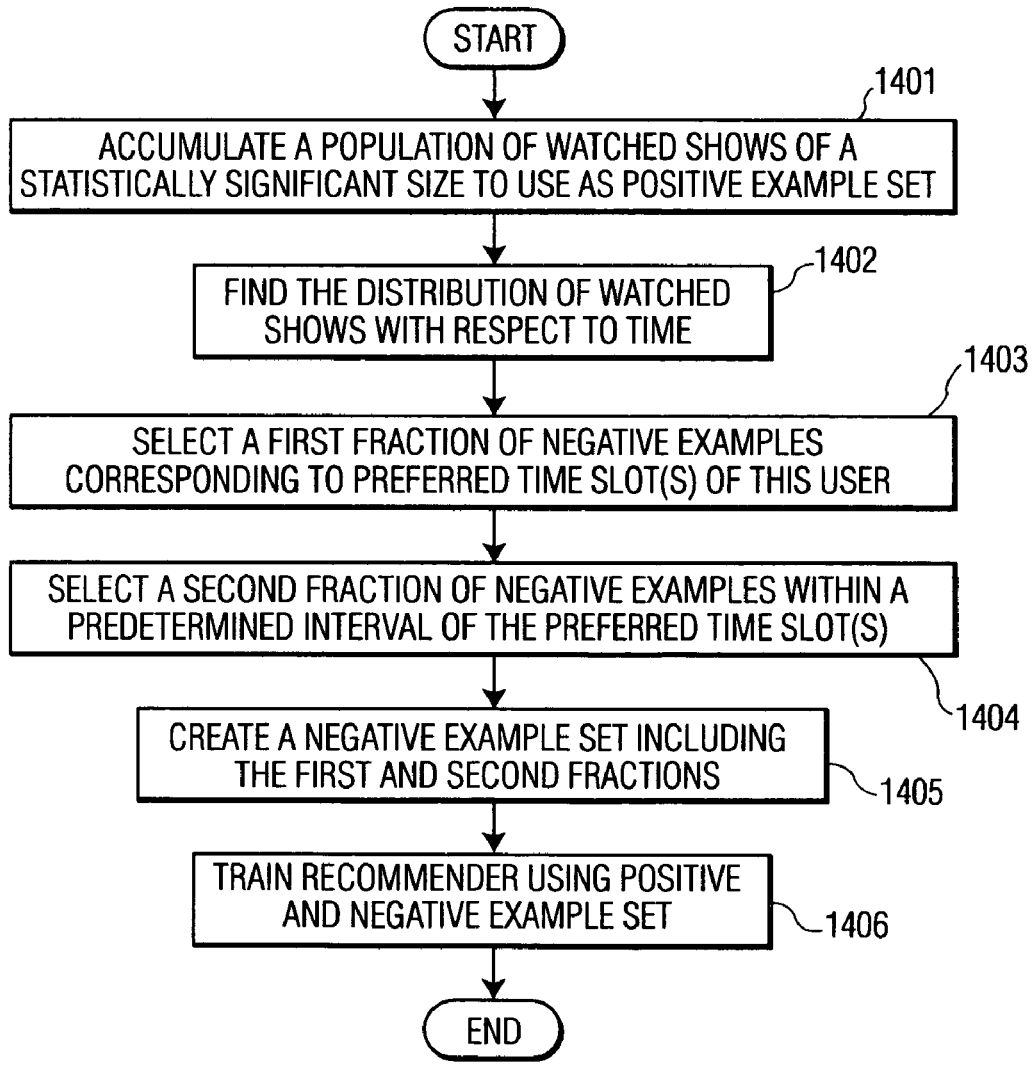
FIG. 14 shows a flowchart of a process for building a training set in accordance with the invention.

FIG. 14 shows a flowchart of a process for building a training set in accordance with the invention. The operations of this flowchart may be executed on the processor 2, or any processor connected with or receiving data from processor 2, e.g. via link 5. Similarly, the artificial intelligence application itself, e.g. the content recommender, may be trained and run on the processor 2 or any processor connected with or receiving data from processor 2, e.g. link 5.

At 1401, a population of watched shows of statistically significant size is accumulated. In the examples of Users H & C, the sizes of the population are over 275 and 175, respectively; however, other size populations are usable, so long as they are statistically significant.

At 1402 the distribution of watched shows with respect to time is determined, and preferred time slots are determined. The distribution can be taken in the form of a histogram, see e.g. FIG. 2 or FIG. 5. In the preferred embodiment, the five time slots having the most shows are chosen. However, more or fewer preferred time slots may be chosen. Optionally, all the time slots viewed by the user may be used. In the examples, the five most preferred time slot for User H will be 21:00, 20:00, 19:00, 23:00, and 22:00, in that order, and the five most preferred time slots for User C will be 8:00, 23:00, 20:00, 24:00, and 10:00, in that order.

Then at 1403, a first fraction of the negative examples is chosen in the preferred time slots of this user. In the preferred embodiment the fraction is 50%.

At 1404, optionally, a second fraction of negative examples is taken from a predetermined time interval around the preferred time slot or slots. In the preferred embodiment, the second fraction will be taken from the hour immediately before and the hour immediately after the single most preferred time slot If optional step 1404 is omitted, then all of the negative examples should be taken from either the preferred time slots, or from all the time slots viewed by that user. Thus, the option—at 1402—of using all the time slots used by the user is most likely to be chosen when step 1404 is to be omitted.

The negative example set is then taken at 1405 to include the first fraction and any second fraction. In the preferred embodiment, the negative example set in fact is just the first and second fractions.

Figure 7:
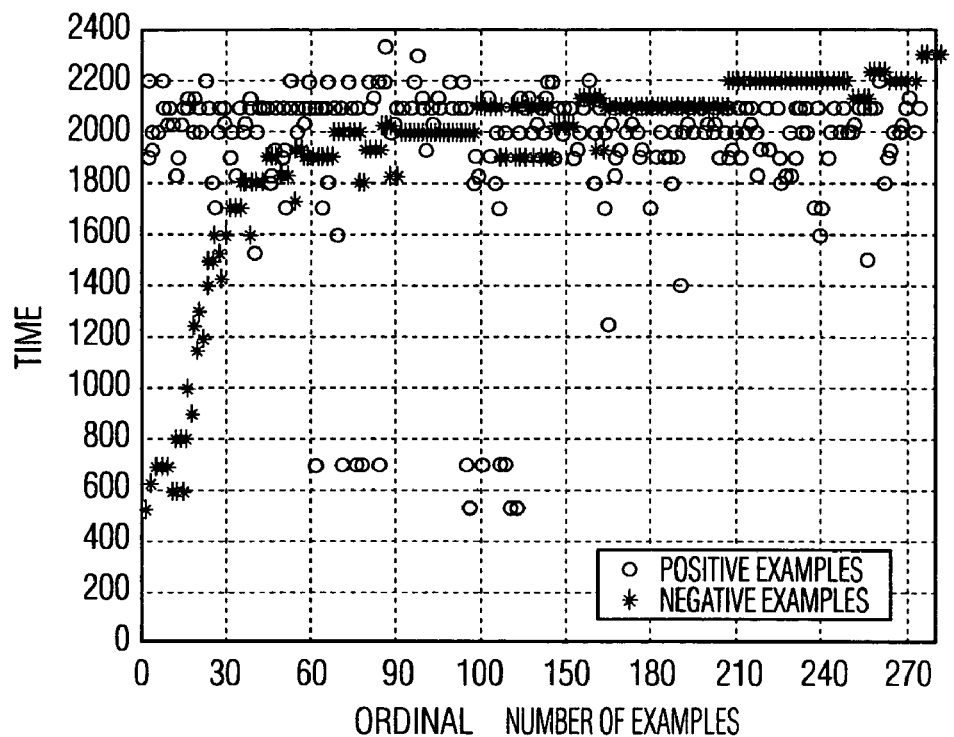
FIG. 7 is analogous to FIG. 1, except using the invention to select negative examples.

At 1406, the recommender is trained using positive and negative example sets. FIG. 7 shows the same type of graph for user H as FIG. 1, except this time the negative examples are chosen in accordance with the technique of FIG. 14. It will be noted that the negative examples fall essentially where the positive examples fall in terms of time. The apparent monotonic curve in the negative examples is only an artifact of the order in which the negative examples are chosen. They need not be chosen in any particular order.

Figure 8:
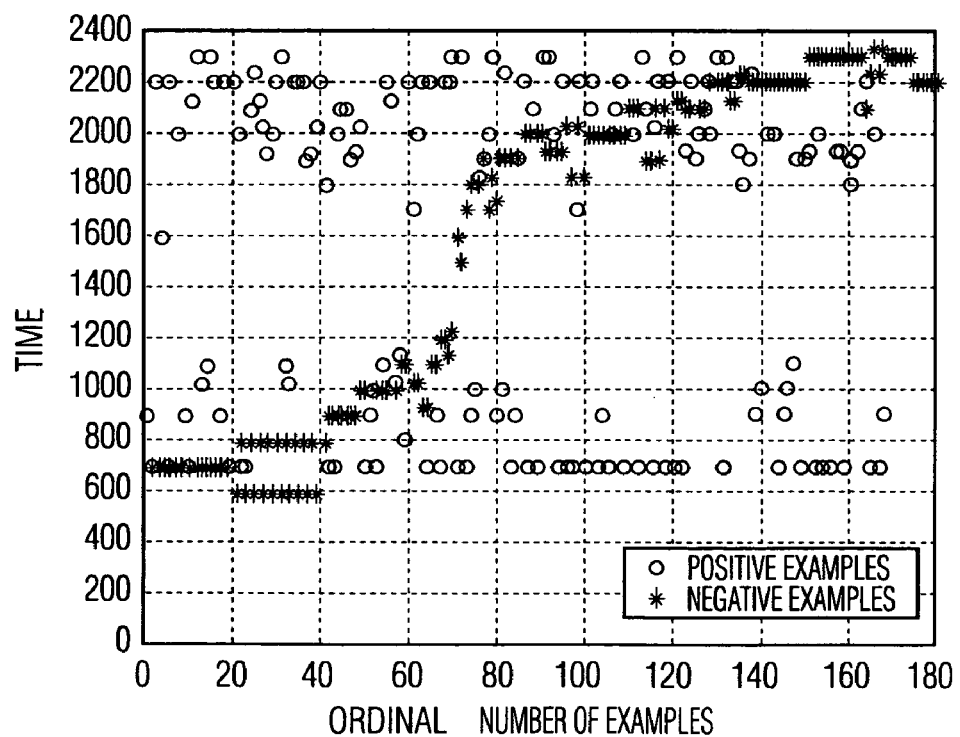
FIG. 8 is analogous to FIG. 4, except using the invention to select negative examples.
Figure 9:
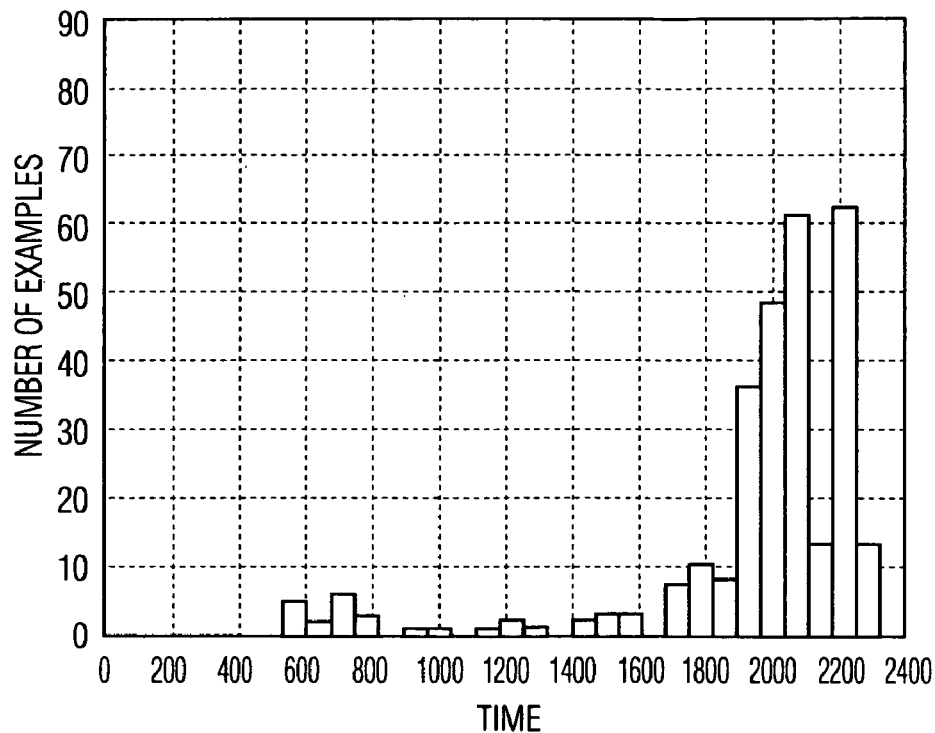
FIG. 9 is analogous to FIG. 3, except using the invention to select negative examples.

FIG. 8 show the same type of graph for user C as FIG. 4, except this time the negative examples are chosen in accordance with the technique of FIG. 14. Again the apparent monotonic curve of the negative examples has no significance as it is only an artifact of the order in which the negative examples are chosen. FIG. 9 is like FIG. 3 with respect to User H, except that the negative examples are chosen in accordance with the technique of FIG. 14. The histogram of positive examples for User H is not repeated here, because it is the same as before.

Figure 10:
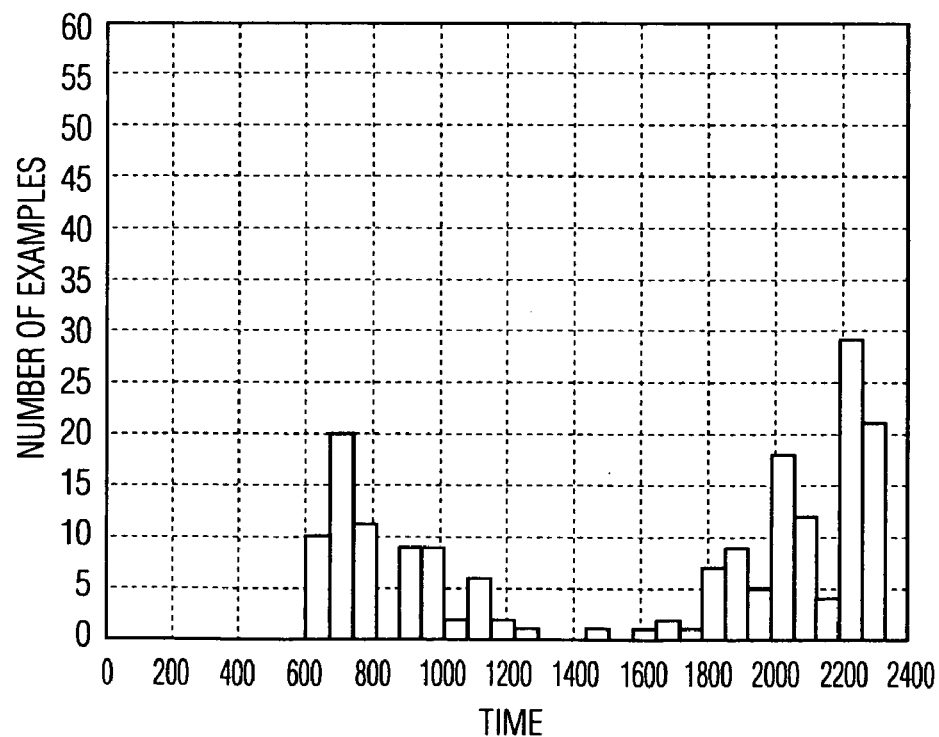
FIG. 10 is analogous to FIG. 6, except using the invention to select negative examples.

FIG. 10 is like FIG. 6 for User C, except that the negative examples are chosen in accordance with the technique of FIG. 14.

The technique of FIG. 14 is shown experimentally to achieve an average performance increase of more than 20%. Performance is measured as the accuracy of recommendations for a set of TV shows for which users' ground truth assessments have been collected. FIG. 15 shows a table which is useful in understanding how performance is evaluated. The table defines four terms:

1. The system predicts a yes answer and there actually is a yes answer (TP)
2. The system predicts a no answer and there is actually a yes answer (FN)
3. The system predicts a yes answer and there actually is a no answer (FP)
4. The system predicts a no answer and there actually is a no answer (TN)

Then the "hit rate" is defined in accordance with the following equation:

$$\text{Hit rate} = \frac{TP}{TP + FP}$$

And the false positive rate is calculated in accordance with the following equation:

$$\text{false postitive rate} = \frac{FP}{FP + TN}$$

Figure 11:
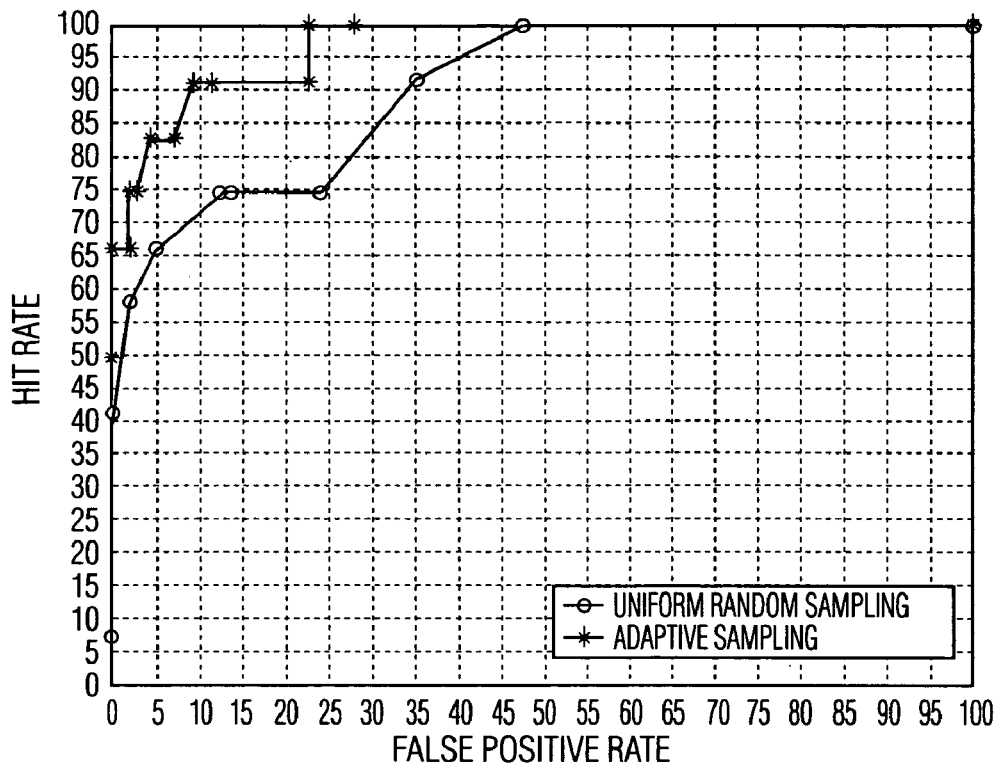
FIG. 11 shows the hit rate for user H as a function of false positive rate.

FIG. 11 shows the hit rate for user H as a function of false positive rate. The stars show the curve for sampling in accordance with adaptive sampling, while the circles show the curve for sampling where negative examples are taken in a uniform random distribution.

Usually a content recommender will first assign a probability of success for each piece of content, with respect to a user. Then the content will be recommended if its probability of success exceeds some threshold. The points on the curve of FIG. 11 correspond to different thresholds. Table 2 of FIG. 16 shows a further explanation of the type of calculation which leads to FIG. 11. In this table, values of numbers of hits, numbers of false negatives, numbers of true rejections, numbers of false positives, hit rate, and false positive rate are shown with respect to various values of the threshold, i.e. taken from 0 to 1 in steps of 0.05. The values of Table 2 are actually for User C, using negative examples chosen in accordance with the invention.

Figure 12:
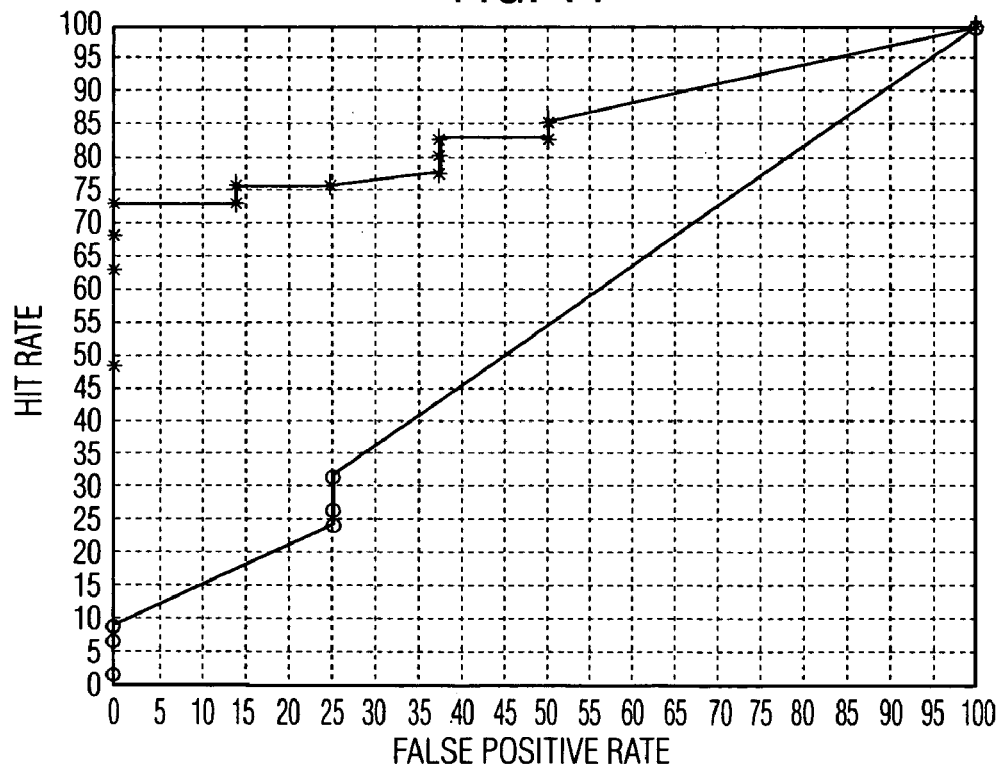
FIG. 12 is analogous to FIG. 11, except with respect to user C.

FIG. 12 shows the same curves with respect to User C. Both techniques work better for User H than for User C, because the population of positive examples was larger for User H than for User C; however, in both cases, the negative example set in accordance with adaptive sampling gives at least a 20% improvement.

In the examples given above, the set of negative examples is generally chosen to have the same number of members as the set of positive examples. However, those of ordinary skill in the art can design training sets in accordance with the invention where the number of negative examples is more or less than the number of positive examples.

From reading the present disclosure, other modifications will be apparent to persons skilled in the art. Such modifications may involve other features which are already known in the design, manufacture and use of training sets for artificial intelligence applications and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated, including method, software embodied in a storage medium, and "means for" claims, to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements.

The invention claimed is:

1. Processing apparatus adapted to implement an artificial intelligence application, which application requires use of training sets having positive and negative examples, the apparatus comprising:
at least one memory adapted to store data and/or instructions; and
at least one processor caused to execute operations, using the at least one memory, for recognizing and maintaining a set of positive examples for training; and
upon completion of recognition of the set of positive examples, for selecting a set of negative examples for training responsive to the set of positive examples, the set of negative examples having a same number of members as the set of positive examples.

2. The apparatus of claim 1, wherein the artificial intelligence application is a content recommender.

3. The apparatus of claim 2, wherein the content is television shows.

4. The apparatus of claim 1, wherein the operations include training the artificial intelligence application responsive to the positive and negative examples; and executing the artificial intelligence application to yield a processing result in a useful application.

5. Processing apparatus adapted to implement an artificial intelligence application, which application requires use of training sets having positive and negative examples, the apparatus comprising:
at least one memory adapted to store data and/or instructions; and
at least one processor caused to execute operations, using the at least one memory, for recognizing and maintaining a set of positive examples for training; and
upon completion of recognition of the set of positive examples, for selecting a set of negative examples for training responsive to the set of positive examples, wherein the positive and negative examples are describable in accordance with at least one feature, the feature having a plurality of possible values within a feature space; the set of positive examples includes at least one subset, each subset including a respective plurality of members sharing a same respective value of a given feature in the feature space, the given feature being one that has been determined in advance to be a dominant feature in the feature space; and the set of negative examples includes at least one respective subset corresponding to the at least one subset of the set of positive examples, the members of each respective subset of negative examples being selected to share the same respective value of the given feature with the members of the subset of the set of positive examples that corresponds with the respective subset of negative examples.

6. The apparatus of claim 5, wherein the set of negative examples includes at least one respective second subset of negative examples, the members of the respective second subset of negative examples being selected to have a value of the given feature that lies within a predetermined range of the same value, but excluding the same respective value.

7. The apparatus of claim 6, wherein no negative example appears twice in the set of negative examples.

8. The apparatus of claim 5, wherein the given feature is time of day.

9. Apparatus adapted to implement an artificial intelligence application, which application requires use of training sets having positive and negative examples, the positive and negative examples being describable in accordance with at least one feature, the feature having a plurality of possible values within a feature space, the apparatus comprising:
at least one memory adapted to store data and/or instructions; and
at least one processor caused to execute operations, using the at least one memory, for recognizing and maintaining a set of positive examples for training, the set of positive examples including at least one subset, each subset including a respective plurality of members sharing a same respective value of a given feature in the feature space, the given feature being one that has been determined in advance to be a dominant feature in the feature space; and for selecting a set of negative examples for training, the set of negative examples including at least one respective subset corresponding to the at least one subset of the set of positive examples, the members of each respective subset of negative examples being selected to share the same respective value of the given feature with the members of the subset of the set of positive examples that corresponds with the respective subset of negative examples.

10. The apparatus of claim 9, wherein the artificial intelligence application is a content recommender.

11. The apparatus of claim 10, wherein the content is television shows.

12. The apparatus of claim 9, wherein the set of negative examples includes at least one respective second subset of negative examples, the members of the respective second subset of negative examples being selected to have a value of the given feature that lies within a predetermined range of the same respective value, but excluding the same respective value.

13. The apparatus of claim 12, wherein the given feature is time of day.

14. The apparatus of claim 9, wherein no negative example appears twice in the set of negative examples.

15. Apparatus adapted to implement an artificial intelligence application, which application requires use of training sets having positive and negative examples, the positive and negative examples being describable in accordance with at least one feature, the feature having a plurality of possible values within a feature space, the apparatus comprising:
at least one memory adapted to store data and/or instructions; and
at least one processor caused to execute operations, using the at least one memory, for recognizing and maintaining a set of positive examples for training, the set of positive examples including at least one subset, each subset including a plurality of members sharing a same respective value of a given feature in the feature space, the given feature being one that has been determined in advance to be a dominant feature in the feature space; and for selecting a set of negative examples for training, the set of negative examples includes at least one respective subset of negative examples, the members of the respective subset of negative examples being selected to have a value of the given feature that lies within a predetermined range of the same respective value, but not including the same respective value.

16. The apparatus of claim 15, wherein the artificial intelligence application is a content recommender.

17. The apparatus of claim 16, wherein the content is television shows.

18. The apparatus of claim 15, wherein no negative example appears twice in the set of negative examples.

19. The apparatus of claim 15, wherein the given feature is time of day.

20. Apparatus adapted to implement an artificial intelligence application, which application requires use of training sets having positive and negative examples, the positive and negative examples being describable in accordance with at least one feature, the feature having a plurality of possible values within a feature space, the apparatus comprising:
at least one memory adapted to store data and/or instructions; and
at least one processor caused to execute operations, using the at least one memory, for recognizing and maintaining a set of positive examples for training, the set of positive examples including at least one subset, each subset including a plurality of members sharing a same respective value of a given feature in the feature space, the given feature being one that has been determined in advance to be a dominant feature in the feature space; and for selecting a set of negative examples for training, the set of negative examples including at least one respective subset of negative examples, the members of the respective subset of negative examples being selected to have a value of the given feature that is approximately adjacent to same respective value.

21. The apparatus of claim 20, wherein the given feature is time of day, and adjacent means either within an hour before or within an hour after.

22. The apparatus of claim 20, wherein each respective subset of negative examples corresponds with a respective one of the at least one subset of positive examples, so that its respective value of the given feature is adjacent to the same respective value of the corresponding subset.

23. A method for selecting negative examples for use in an artificial intelligence application, the method comprising executing operations on at least one data processing device, the operations comprising:
selecting a set of positive examples that satisfy at least one desired external criterion;
upon completion of the selecting of the positive examples and responsive thereto, selecting a set of negative examples; and
upon completion of selecting the positive examples, determining a particular value of a given feature in feature space, which particular value characterizes a significant subset of the positive examples, the selecting of the set of negative examples being such that a significant subset of the negative examples has a selected value responsive to the particular value of the given feature in feature space.

24. A method of training an artificial intelligence application, the method comprising executing operations in at least one data processing device, the operations comprising:
selecting negative examples in accordance with the method of claim 23; and
training the artificial intelligence application using the negative examples.

25. The method of claim 23, wherein the selected value is the same as the particular value.

26. The method of claim 23, wherein the selected value lies in a selected range around the particular value in feature space, but is not the same as the particular value.

27. A method of training an artificial intelligence application, the method comprising executing operations in at least one data processing device, the operations comprising:
selecting negative examples in accordance with the method of claim 23; and
training the artificial intelligence application using the negative examples.

28. The method of claim 23, wherein the artificial intelligence application recommends content.

29. A medium readable by at least one data processing device and embodying code for causing the data processing device to execute operations, the operations comprising:
selecting a set of positive examples that satisfy at least one desired external criterion;
upon completion of selecting the positive examples and responsive thereto, selecting a set of negative examples; and
upon completion of selecting the positive examples, determining a particular value of a given feature in feature space, which particular value characterizes a significant subset of the positive examples, the selecting of the set of negative examples being such that a significant subset of the negative examples has a selected value responsive to the particular value of the given feature in feature space.

30. The medium of claim 29, wherein the selected value is the same as the particular value.

31. The medium of claim 29, wherein the selected value lies in a selected range around the particular value in feature space, but is not the same as the particular value.

32. The medium of claim 29, wherein the operations further comprise training an artificial intelligence application using the positive and negative examples.

33. The medium of claim 32, wherein the operations further comprise running the artificial intelligence application to give a solution to a real external problem.

34. The medium of claim 33, wherein the solution is a content recommendation.

* * * * *